United States Patent [19]
Tansi et al.

[11] Patent Number: 5,898,130
[45] Date of Patent: Apr. 27, 1999

[54] ELECTRICAL RECEPTACLE COVER WITH MODULAR INSERTS

[75] Inventors: Hakki M. Tansi, Woodbury, N.Y.; Joseph G. Spanedda, Foster, R.I.

[73] Assignee: Leviton Manufacturing Co., Inc., Little Neck, N.Y.

[21] Appl. No.: 08/911,882

[22] Filed: Aug. 15, 1997

[51] Int. Cl.⁶ .............................. H02G 3/14; H05K 5/03
[52] U.S. Cl. .................... 174/66; 220/241; 439/170; 439/491
[58] Field of Search ................ 174/66, 67; 220/3.8, 220/241, 242; 439/170, 166, 491

[56] References Cited

U.S. PATENT DOCUMENTS

| | | | |
|---|---|---|---|
| 4,534,487 | 8/1985 | Rapata ............................ | 220/241 X |
| 4,801,271 | 1/1989 | Piper ............................... | 439/142 X |
| 5,180,886 | 1/1993 | Dierenbach et al. ............ | 174/66 |

FOREIGN PATENT DOCUMENTS 321184  11/1929  United Kingdom ................ 174/66 X

OTHER PUBLICATIONS

Pass & Seymour, Inc., Product Brochure entitled "Wiring Devices . . . Designed for Superior Performance," dated Aug. 16, 1961.

IBM Technical Disclosure Bulletin, vol. 24 No. 8, Jan. 1982 entitled "Cover Latch".

*Primary Examiner*—Dean A. Reichard
*Attorney, Agent, or Firm*—Paul J. Sutton

[57] ABSTRACT

A cover for a surface mounted electrical box in which are placed one of a selected group of receptacles each having different electrical plug blade contact arrangements, sizes and shapes. The partial cover has a cut-out and receives therein a selectable modular insert which contains apertures which correspond to the plug prong contacts of the receptacle. The modular insert locks in the cut-out and fits flush with the remainder of the partial cover. Thus, the cover is assembled to match the receptacle within the box.

8 Claims, 5 Drawing Sheets

ELECTRICAL RECEPTACLE COVER WITH MODULAR INSERTS

BACKGROUND OF THE INVENTION

1. Field of the Invention

This invention is directed to a cover for an electrical receptacle housing and more particularly to a universal cover which can be adapted to particular receptacles within such housing by the use of interchangeable modular inserts.

2. Description of the Prior Art

Electrical receptacles for receiving the plug of a cable connected to an electric stove or other high current loads and connected to a source of power have long been known. Such electrical receptacles can be mounted in a wall or panel mounted to the surface of a wall, table, etc. Typically, these electrical receptacles take the form of a housing having an integral cover or face plate. The electrical circuitry and components in the housing are appropriate for the electrical rating of the load device and the type of service expected. To avoid loads being connected to inappropriate power sources the shape and placement of the plug blade contacts and corresponding apertures in the housing have been standardized. Thus, a great number of housings must be manufactured, stocked and carried by an electrician and user. The problem is multiplied where different housing materials must be selected for different ratings. Also, different materials for different parts of the cover cannot be used, the cover is made of the same material as the housing.

Further, tooling costs for making housings having plug blade contact apertures for all possible electrical contact arrangements are significant. There is, thus, a need for providing housings for electrical receptacles which are less expensive to tool.

OBJECTS AND SUMMARY OF THE INVENTION

It is an object of the invention to provide a novel separate electrical receptacle housing cover that is inexpensive to manufacture.

It is another object of the invention to provide a novel electrical receptacle housing cover made of interchangeable components.

It is still another object of the invention to provide a novel electrical receptacle housing with cover that reduces the cost of stocking electrical receptacle housings.

It is a further object of the invention to provide a novel electrical receptacle housing cover capable of withstanding electrical arcing and mechanical impact.

It is still a further object of the invention to provide a novel electrical receptacle housing cover which is simple in construction and inexpensive to manufacture.

It is yet a further object of the invention to provide a novel electrical receptacle housing cover which provides the end user with flexibility for use with load devices of differing electrical ratings.

These and other objects of the invention are accomplished by providing a novel electrical receptacle housing cover with interchangeable modular inserts for such housing.

A cover for an electrical receptacle housing is provided comprising a partial cover and a modular insert to complete the cover. Additionally, there is provided a common partial cover for an electrical receptacle housing with interchangeable modular inserts.

The above and other objects, aspects, features and advantages of the invention will be more readily apparent from the description of the preferred embodiments taken in conjunction with the accompanying drawings and appended claims.

BRIEF DESCRIPTION OF THE DRAWINGS

The invention is illustrated by way of example, and not limitation, in the figures of the accompanying drawings in which like reference characters denote like and corresponding parts and in which.

DESCRIPTION OF THE PREFERRED EMBODIMENT

Figure 1:
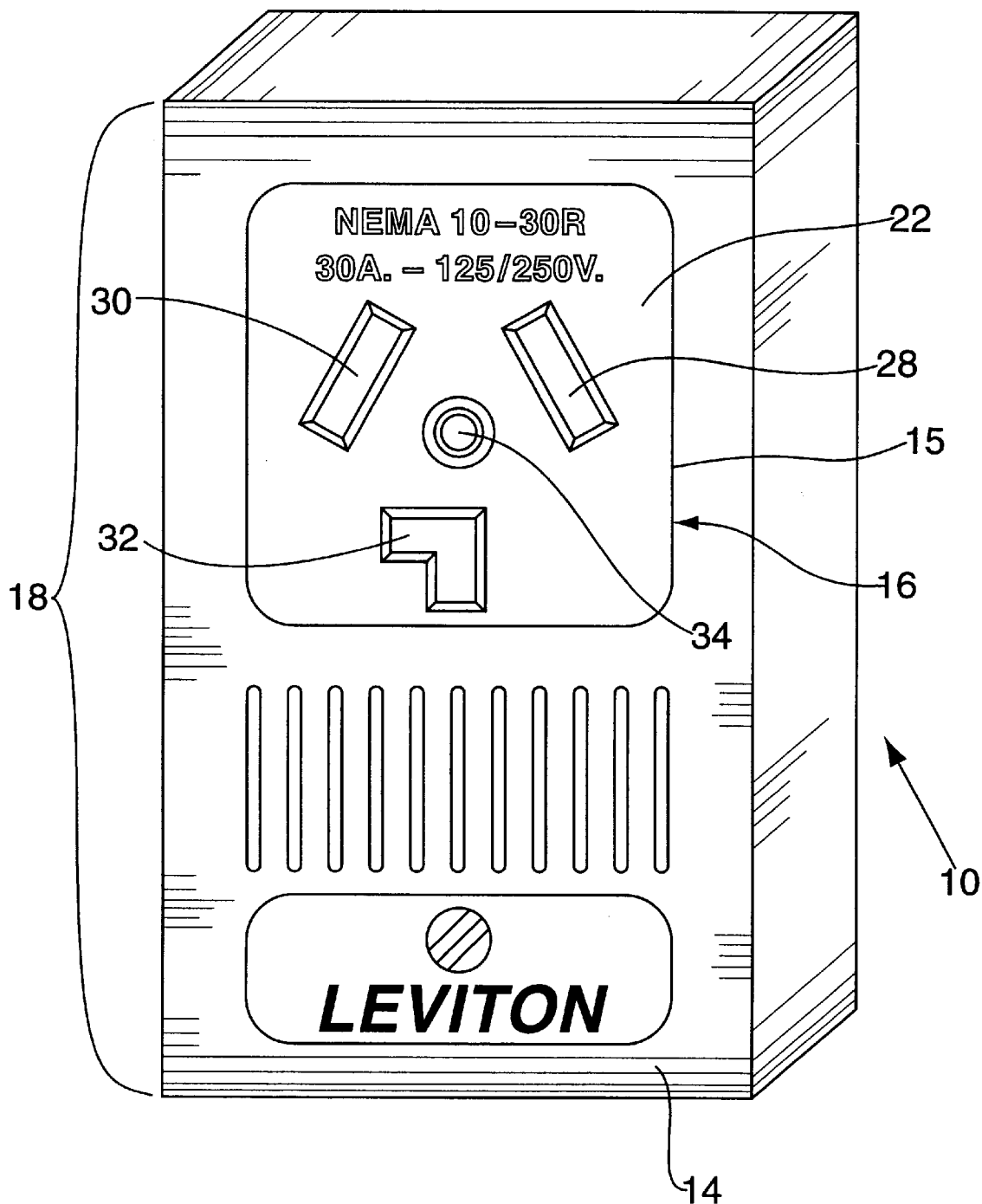
FIG. 1 is a front perspective view of a receptacle housing and cover in the form of a partial cover with modular insert according to the concepts of the invention.

FIG. 1 illustrates an electrical receptacle 10 which includes a complete cover 18, in which a receptacle (not shown) can be placed, constructed in accordance with the novel concepts of the invention and made up of a partial cover 14 and a modular insert 16 which are joined to form the complete cover 18 (hereinafter referred to as "cover"). The modular insert 16 may have many different configurations of plug blade apertures. As illustrated in FIG. 1, the modular insert 16 has plug blade apertures in the configuration for a NEMA 10-30R, 30 Amp. –125/250 Volt 60 Hz AC, 3-pole, 3 wire non-grounding configuration for a load device such as an electrical stove or dryer requiring a high current to power it. Modular insert 16 has two angled slots 28 and 30 and an L-shaped slot 32. An aperture 34 permits the modular insert 16 to be bolted to a receptacle in the housing (not shown) by a bolt (not shown) passing through aperture 34. The inserts 16 can be rectangular or square with sharp or rounded corners, round or any other desired shape.

Figure 7E:
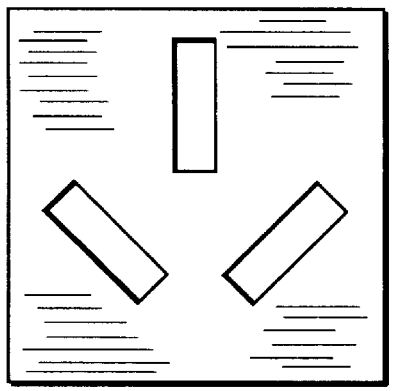
FIGS. 7A to 7F are top plan views of the top surface of the modular insert showing different plug blade aperture arrangements.
Figure 7F:
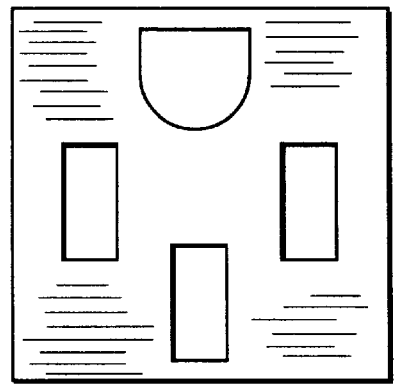
Figure 7A:
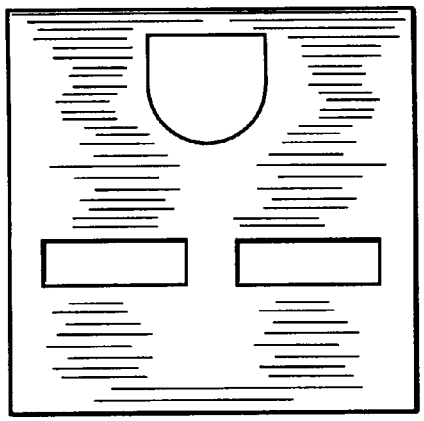
Figure 7B:
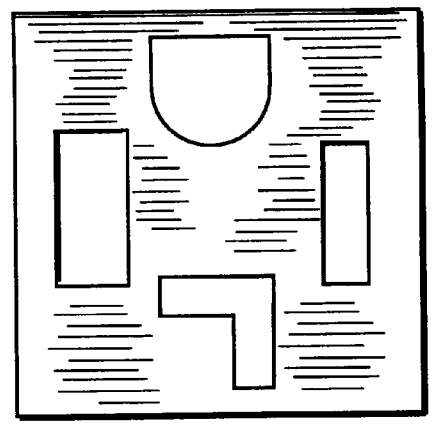
Figure 7C:
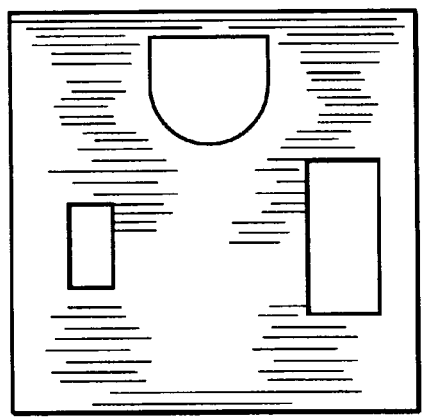
Figure 7D:
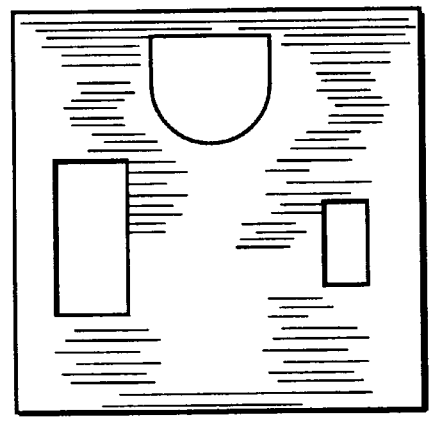

The configuration of the blade apertures will be arranged according to the plug to be received. The arrangement of FIG. 7A is for a NEMA 6-30R-30 Amp. 250V 60 Hz AC 2-pole, 3-wire grounding plug. Similarly FIG. 7B is for a NEMA 14-30R, 30 amp. –125/250V 60 Hz AC, 3-pole, 4-wire grounding configuration; FIG. 7C is for a NEMA 5-50R, 50 amp. –125V 60 Hz AC, 2-pole, 3-wire grounding configuration; FIG. 7D is a NEMA 6-50R, 50 amp. –250V 60 Hz AC, 2-pole, 3-wire grounding configuration; while FIG. 7E is a NEMA 10-50R, 50 amp. –125/250V 60 Hz AC, 3-pole, 3-wire non-grounding configuration; and FIG. 7F is a NEMA 14-50R, 50 amp. –125/250V 60 Hz AC, 3-pole, 4-wire grounding configuration as illustrated. Other configurations for different ratings are also contemplated. The ground contact is located behind the U-shaped apertures (see FIGS. 7A, 7B, 7C, 7D and 7F) to receive the usual U-shaped ground pin of a grounding plug (not shown).

The electrical receptacle and cover may be configured for use with a particular electrical load having requirements of a particular voltage and current rating during the manufacturing process and before distribution and sale so that the end user purchases a fully configured electrical receptacle housing and cover, or the electrical receptacle housing and cover may be sold such that the end user configures the electrical receptacle housing for use with a particular electrical load having a particular voltage and current rating. For example, the electrical receptacle housing may be sold with a partial cover and more than one modular insert such that the end user chooses the modular insert desired for the particular electrical load depending on the voltage and current rating of the electrical load. Alternatively, the combination of a receptacle housing, the electrical components and circuits to be located in the housing appropriate for the load and a modular insert may be purchased as a package. The end user chooses can separately purchase the modular insert for the particular electrical load to be connected to the receptacle depending upon the voltage and current rating of the electrical load. The end user configures the cover for the electrical receptacle.

As discussed above the partial cover 14 which receives the modular insert 16 is common to many configurations of the modular insert. Additionally, the electrical components and circuits within the housing of the electrical receptacle may also depend upon the voltage and current rating of the electrical load to be powered by connection to the receptacle.

The use of a separate partial cover and a separate insert permits the materials from which these items are fabricated to be selected to suit the particular use and conditions under which these items are used.

The modular insert 16 of the present invention is made of a material that withstands electrical arcing. More particularly, the modular insert 16 may be made of a thermoset plastic such as nylon. In contrast, the partial cover 14 of the electrical receptacle is made of a material that withstands mechanical stress and impact such as a thermoplastic methyl methacrylate sold under the trade names Lexan or Noryl may be employed. The receptacle with which the housing is used may be of the grounding or non-grounding type and have suitable blade apertures. Since the modular insert 16 can have different plug blade aperture configurations the cost of an inventory of suitable housings is greatly reduced.

Figure 2:
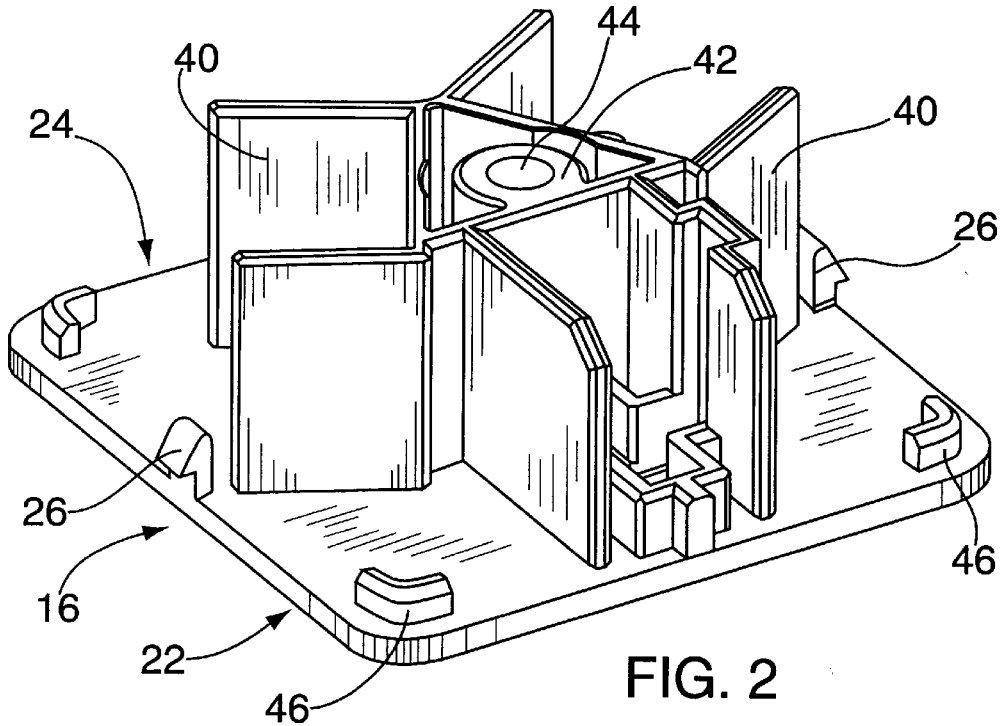
FIG. 2 is a rear perspective view of the modular insert of the cover of FIG. 1.
Figure 3:
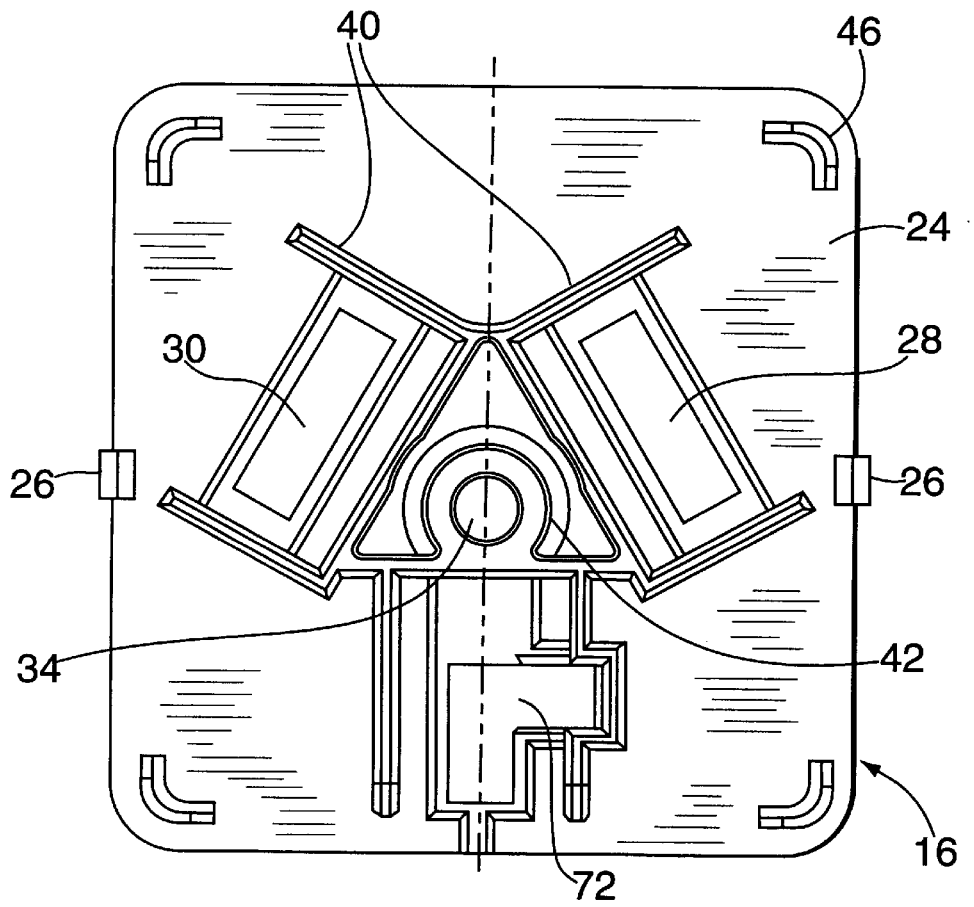
FIG. 3 is a top plan view of the modular insert of FIG. 2.

FIGS. 2 and 3 show the back portion 24 of the modular insert 16. Formed thereon are a number of barriers 40 which fit about the blade contacts of the receptacle (not shown) and provide insulation for the conductors (not shown) as well as the blade contacts. These barriers 40 prevent arcing or direct contact between various conductors coupled to the blade contacts. A central hub 42 with a bore 44, therein receives the screw (not shown) which fastens the cover 18 to the receptacle (not shown). In addition, raised tabs 46 are placed adjacent the corners of the back 24 of modular insert 16 to position the modular insert 16 in the cover cutout 15 of partial cover 14 as will be explained below. Also extending from the rear surface 24 of modular insert 16 are snap legs 26.

Figure 6:
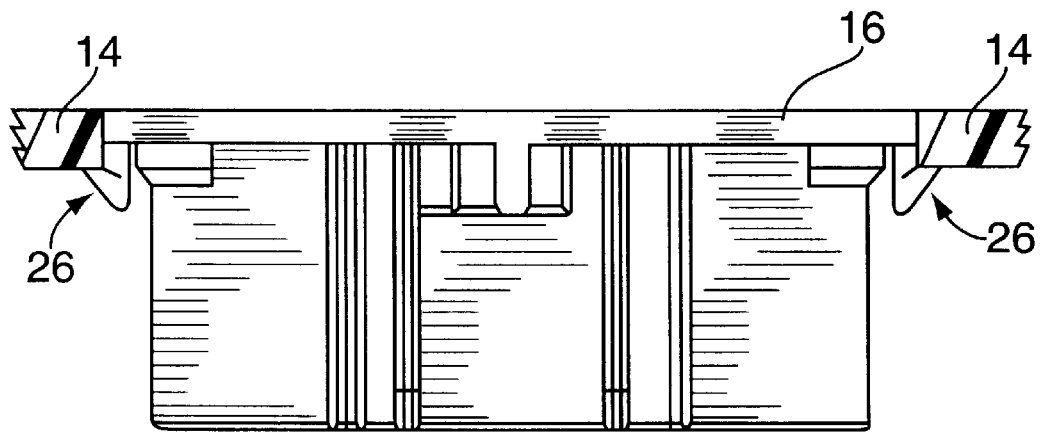
FIG. 6 is a fragmentary side elevational view showing the modular insert in place in the partial cover.
Figure 4:
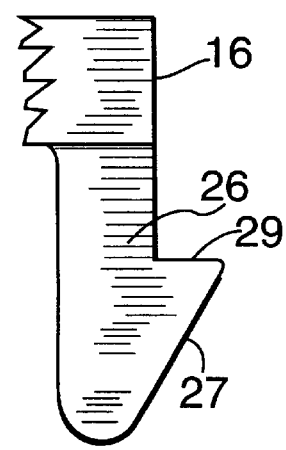
FIG. 4 is a fragmentary side elevational view of the modular insert showing a snap leg.
Figure 5:
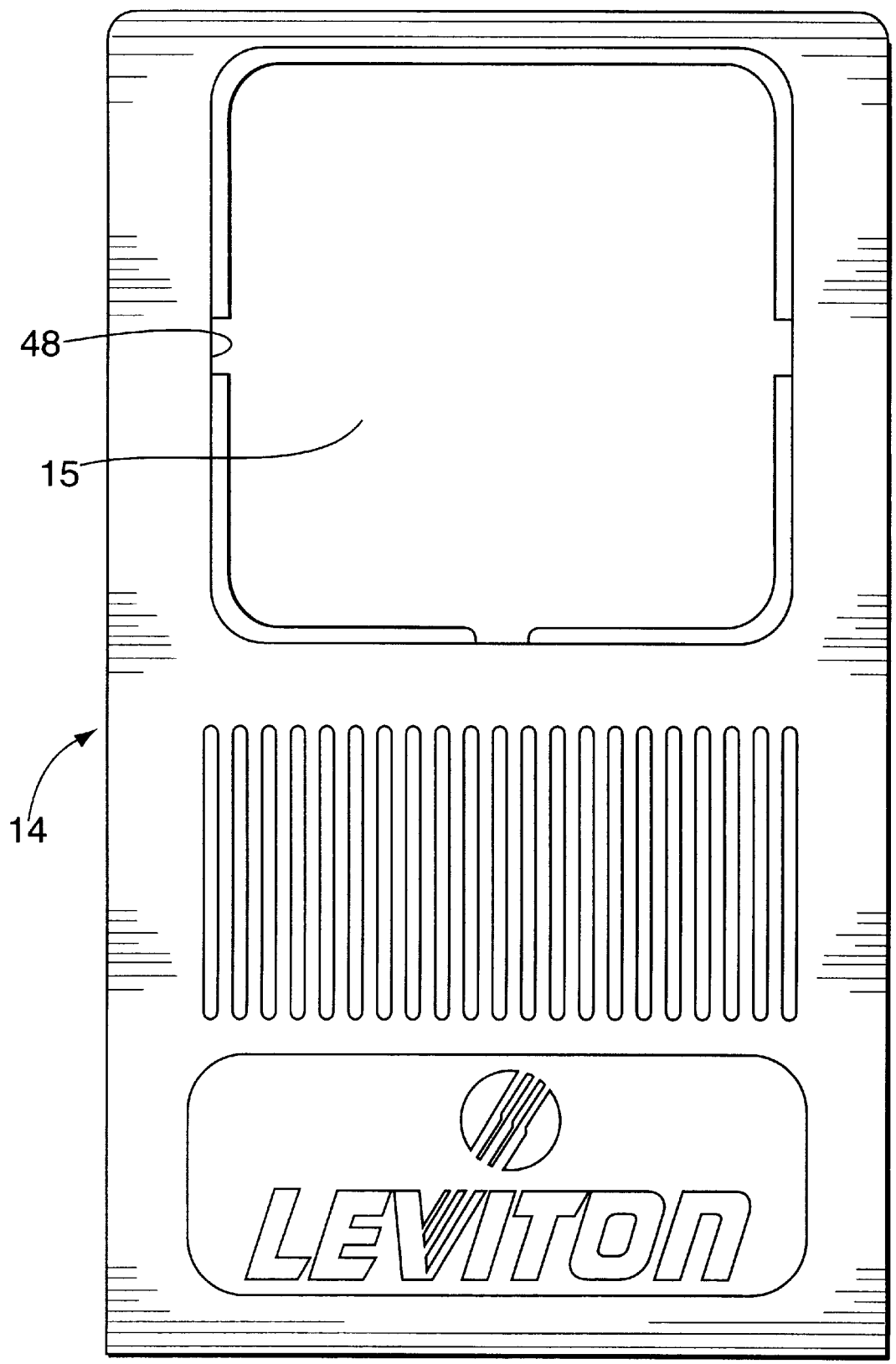
FIG. 5 is a top plan view of the housing of the device of FIG. 1 with the modular insert removed.

FIG. 5 shows partial cover 14 which includes a cut-out 15 to receive the modular insert 16. Also placed about the periphery of the cut-out 15 are three recesses 48. As the insert 16 is placed in the cut-out 15, the front inclined face 27 of the snap legs 26 (see FIG. 4) engage the back wall of the recesses 48 deflecting the snap legs 26 inwardly until the flat top surface 29 is reached. The raised tabs 46 help position the modular insert 16 in the cut-out 15. The snap legs 26 then return to their original positions gripping the undersurface of the partial cover 14 adjacent recesses 48. This assembles the insert 16 to the partial cover 14. As shown in FIG. 6, the modular insert 16 top surface 22 is flush with the top surface of the partial housing 14. The thus completed cover 18 may now be fastened to a receptacle within the housing (not shown).

It should be understood that the partial cover may contain more than one cut-out and that each cut-out will accept a suitably dimensioned modular insert. It should also be understood that the two or more modular inserts do not necessarily have the same plug blade apertures, but can be mixed according to the receptacles within the housing.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

We claim:

1. A cover including one of a plurality of electrical receptacles each having a different contact configuration selectively placed over a surface mounted electrical box comprising:

a) a partial cover having a top wall, a bottom wall, two side walls and a front wall so joined as to form a five sided box with a rear side left open to fit over said surface mounted box, said partial cover having a cut-out in said front wall defined by a continuous edge of said partial cover;

b) a selectable modular insert for placement in said cut-out adjacent said continuous edge of said partial cover, said modular insert having a front face coplanar with said partial cover front wall and a rear face on which is located a selected one of a plurality of electrical receptacles; and c) a plurality of apertures in said modular insert corresponding to the contact configuration of the selected one of said plurality of electrical receptacles placed on the rear face of said modular insert.

2. A cover as defined in claim 1, further comprising means to hold said selectable modular insert in assembly with said partial cover.

3. A cover as defined in claim 2, having a further aperture in said selectable modular insert to receive a screw therethrough to mount said cover to said surface mounted box.

4. A cover as defined in claim 2, where said means to hold said selectable modular insert in assembly with said partial cover comprises deflectable snaps.

5. A cover as defined in claim 1, wherein said plurality of apertures in said selectable modular insert is three.

6. A cover as defined in claim 5, wherein two of the apertures are slots and the third is U-shaped.

7. A cover as defined in claim 6, wherein the two slots are of different lengths.

8. A cover, as defined in claim 1, wherein said modular insert have at least one barrier on their rear faces.

* * * * *